United States Patent [19]

Muhs et al.

[11] 4,112,413
[45] Sep. 5, 1978

[54] RATE OF CHANGE IN ALTITUDE APPARATUS

[75] Inventors: Donald Paul Muhs; Russell Frank Hart, both of Davenport, Iowa

[73] Assignee: The Bendix Corporation, Southfield, Mich.

[21] Appl. No.: 726,882

[22] Filed: Sep. 27, 1976

[51] Int. Cl.$^2$ .............................................. G08B 5/36
[52] U.S. Cl. ........................... 340/27 R; 250/231 SE; 340/190; 340/201 P
[58] Field of Search ................ 340/27 R, 27 AT, 190, 340/201 P, 27 NA; 250/231 SE, 571, 215; 73/178 R, 384, 179; 356/4; 318/584

[56] References Cited

U.S. PATENT DOCUMENTS

| | | | |
|---|---|---|---|
| 2,726,544 | 12/1955 | Anastasia et al. | 73/179 |
| 2,931,221 | 4/1960 | Rusk | 73/179 |
| 3,206,975 | 9/1965 | Elwell et al. | 318/584 |
| 3,491,244 | 1/1970 | Stewart | 340/190 |
| 3,815,420 | 6/1974 | Springer | 73/384 |
| 3,842,676 | 10/1974 | Brown et al. | 73/384 |
| 3,916,185 | 10/1975 | Jehly | 340/27 R |
| 4,006,472 | 2/1977 | Greene | 340/201 P |

OTHER PUBLICATIONS

Zuch, "Voltage to Frequency Converters", Electronics, May 15, 1975, pp. 91-95.

Primary Examiner—John W. Caldwell, Sr.
Assistant Examiner—James J. Groody
Attorney, Agent, or Firm—Leo H. McCormick, Jr.; Ken C. Decker

[57] ABSTRACT

A rate of change in altitude computer for providing a pilot with information to safely operate an aircraft. A beam of light is communicated through a mask. A gear responsive to altitude rotates the mask. A photocell receives the beam of light as it passes through the mask to produce sinusoidal wave signals. The positive node of the sinusoidal wave signal is modified to activate a transistor which allows a capacitor to be charged for a time period equal to the positive node. During the negative node of the sinusoidal wave signal the capacitor discharges. When the voltage associated with the charging and discharging of the capacitor is averaged, a steady state voltage is produced. The steady state voltage, which is proportional to the rate of rotation of the mask, drives a dial of an indicator to provide an operator with visual information relating to instantaneous rate of changes in altitude.

10 Claims, 2 Drawing Figures

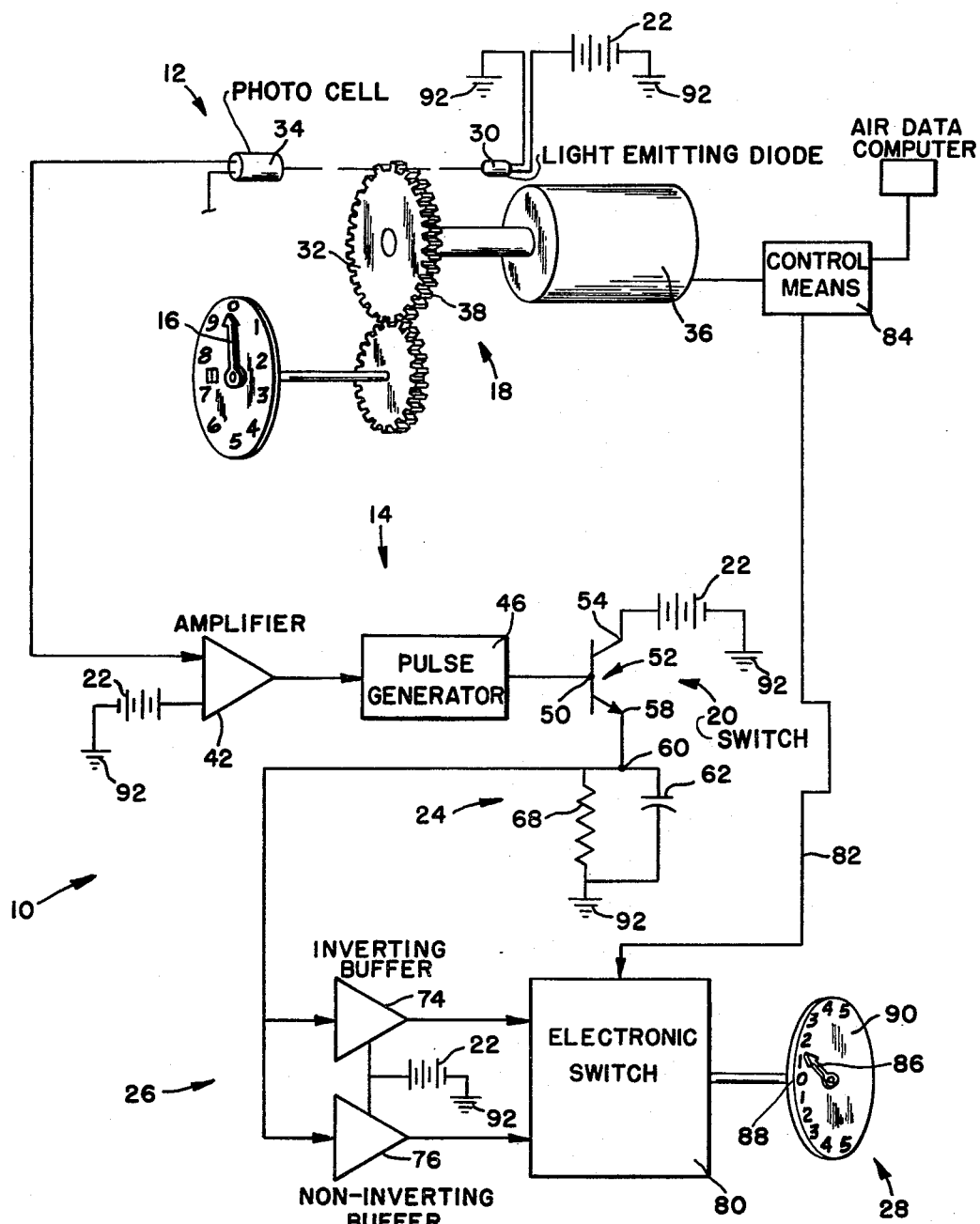

RATE OF CHANGE IN ALTITUDE APPARATUS

BACKGROUND OF THE INVENTION

This invention relates to an altitude computer which is adapted to supply a rate of change in altitude indicator with information to enable a pilot to safely operate an aircraft.

Most present day aircraft use air data computers to calculate information utilized in piloting an aircraft. These air data computers receive information relating to pressure data, indicated air speed, rate of ascent or descent and temperature in order to calculate true air speed and density altitude. The rate of climb and descent information is especially useful during take-off and landings in order that a pilot can provide a smooth transition of the aircraft into the flight pattern around airports.

Information relating to rate of ascent and descent is usually derived from a rate sensing apparatus associated with the altitude sensing aneroid of the type disclosed in U.S. Pat. No. 3,456,506. Such rate sensing apparatus include a hollow diaphragm or aneroid located in a sealed container. The interior of the diaphragm is vented to the surrounding environment. However, a flow restricting orifice limits communication between the sealed container and the surrounding environment. Any change in atmospheric pressure due to a change in altitude of the aircraft is immediately communicated to the interior of the diaphragm; however, the flow restricting orifice delays the change in atmospheric pressure communicated into the sealed container and thereby creates a pressure differential across the diaphragm. This pressure differential causes the diaphragm to expand or contract depending upon whether the aircraft is ascending or descending. A mechanical linkage connects the diaphragm to an indicator dial to provide the pilot with rate of change in altitude information. It has recently been discovered that the relationship between atmospheric pressure and altitude is only linear up to about 28,000 feet. Therefore, the accuracy of differential pressure rate sensing apparatus is limited to altitudes below 28,000 feet.

SUMMARY OF THE INVENTION

It is well known that altimeters utilized in aircraft have correcting means for compensating for the non-linearity relationship between indicated atmospheric pressure altitude and actual altitude. In an effort to simplify aircraft instrumentation we have devised a computer mechanism for utilizing the information supplied to the altimeter pointer to compute the rate of change in altitude of an aircraft.

The computer mechanism includes a detector with a sensor located on one side of the driving gear of the altimeter pointer. A light source on the opposite side of the driving gear is aligned with the sensor. The gear teeth on the driving gear intersect a beam of light transmitted to the sensor thereby causing the sensor to generate a sinusoidal signal which is indicative of the rotational speed of the gear. The sinusoidal signal represents the rate of change in altitude of the aircraft. The positive node of the sinusoidal signal is modified by a signal generator to produce an operational signal having a constant pulse width. Each constant pulse width operational signal actuates a first switch which allows electrical current to flow from a source at a fixed charging rate into a capacitor. At the end of each constant pulse width operational signal, the flow of electrical current from the source is interrupted and the capacitor is allowed to discharge to ground through a resistor. The charging and discharging of the capacitor when averaged with respect to time produces a steady state voltage whose amplitude is proportional to the frequency of the sinusoidal signal. This steady state voltage is transmitted through either an inverting buffer or a non-inverting buffer and amplified to a level sufficient to operate an indicator. A second switch which receives an operational signal corresponding to the rotational direction of the driving gear of the altimeter selects a flow path for the amplified voltage signal through either the inverting buffer or the non-inverting buffer to inform the pilot of the rate of change in altitude associated with an ascending or descending operation of the aircraft.

It is the object of this invention to provide a rate of change indicator with switch means which allows a capacitor to be charged at a constant rate for a period of time and thereafter permits the capacitor to be discharged at a variable rate in response to a sinusoidal signal. The charging and the discharging of the capacitor averaged with respect to time creates an operational signal which drives a pointer to inform an operator of instantaneous changes in altitude.

It is the object of this invention to provide a means for computing a rate of change in altitude of an aircraft by sensing the rotation of a gear train driving an output gear associated with an altimeter.

It is another object of this invention to provide a means for generating a voltage signal corresponding to the frequency of a sinusoidal wave signal derived by moving a mask with respect to a source of illumination and a phototransistor.

It is a further object of this invention to provide a rate of change in altitude indicator with an operational signal which is directly proportional to the speed of rotation of a gear train driving a pointer of an altimeter.

These and other objects will become apparent from reading this specification and viewing the drawing.

BRIEF DESCRIPTION OF THE DRAWINGS

FIG. 1 is a schematic illustration of a rate of change in altitude apparatus made according to this invention; and FIG. 2 is a graph illustrating the operational signals generated by various components associated with the altitude apparatus of FIG. 1.

DETAILED DESCRIPTION OF A PREFERRED EMBODIMENT

The rate of change in altitude apparatus 10 shown in FIG. 1 includes a detector means 12 which supplies a generator 14 with an input signal indicative of altitude changes communicated to a pointer 16 of an altimeter 18. The generator 14 modifies the input signal to produce a constant width pulse signal. The constant width pulse signal actuates a first switch 20 which connects voltage source 22 to voltage generator 24 for a time period equal to the duration of the constant width pulse. The voltage generator 24 creates a voltage signal which is directly proportional to the frequency of the input signal generated by the detector means 12. The voltage signal is transmitted to a buffer 26 and amplified to a level sufficient to operate pointer 86 of an indicator means 28. The pointer 86 provides an operator with instantaneous visual information relating to the rate of change in altitude of the aircraft.

In more particular detail, the detector 12 includes a light source such as a light emitting diode 30 which is positioned adjacent a driving gear 32 in the gear train of the pointer 16 of the altimeter 18. A light responsive photocell 34 is located adjacent the driving gear 32 opposite the light emitting diode 30. The individual teeth 38 on the driving gear 32 periodically interrupts the light from diode 30 to the photocell 34 whenever gear 32 is rotated by servomotor 36. The periodic interruption of the light beam causes the photocell 34 to produce a sinusoidal change in altitude signal, as illustrated by line 40 in FIG. 2. This change in altitude signal is transmitted to an amplifier-limiter 42 of the generator means 14. The amplifier-limiter 42 modifies the altitude signal by converting the positive node of the sinusoidal signal into a square wave signal, illustrated by line 44 in FIG. 2. The square wave signal has the same frequency as the sinusoidal signal. The square wave signal is transmitted to a constant width pulse generator 46 where the leading edge of the square wave signal triggers the generation of a pulsating signal, illustrated by line 48 in FIG. 2.

Each pulse of the pulsating signal is transmitted to the base 50 of a PNP transistor 52 in the first switch means 20. The collector 54 of the transistor 52 is connected to the direct current source 22. The pulsating signal raises the electrical potential of the base 50 to allow a fixed current to flow from the emitter 58 into junction 60 of the voltage producing means 24 for a time period equal to the duration of each pulse of a pulsating signal. The fixed current communicated from the emitter 58 raises the voltage across capacitor 62 at a constant rate as illustrated by line 64 in FIG. 2. When the current flow terminates, the voltage in the capacitor 62 reaches a peak 66. Thereafter, the capacitor 62 discharges through resistor 68 at an exponential rate which follows a curve 70, as illustrated in FIG. 2. However, before capacitor 62 is completely discharged, another pulse from the generator 46 again turns the transistor 52 on and allows current to recharge the capacitor 62 from point 72 to peak 66. We have found that when the voltage represented by peak 66 and point 72 are averaged with respect to time, a steady state voltage as illustrated by line 74 in FIG. 2, is produced across the capacitor 62. The value of this voltage is directly proportional to the frequency of the sinusoidal signal of the input signal generated in the detector 12.

The steady state voltage is transmitted to an inverting buffer 74 and to a non-inverting buffer 76 in buffer member 26. The steady state voltage transmitted to buffers 74 and 76 is amplified to a level sufficient to operate the rate of change in altitude indicator 28. The buffer member 26 includes a flip-flop switch 80 which is connected by lead 82 to a control means 84 which operates the servomotor 36 of the altimeter 18. The control means 84 is adapted to produce a positive signal in response to an increase in altitude, and a negative signal in response to a decrease in altitude of the aircraft. A positive signal presented to flip-flop switch 80 allows a positive amplified voltage to flow from the non-inverter buffer 76 and drives pointer 86 in a clockwise direction with respect to a null position 88, whereas, a negative signal presented to flip-flop switch 80 allows a negative amplifier voltage to flow from the inverter buffer 74 and drive pointer 86 in a counterclockwise direction with respect to the null position 88.

MODE OF OPERATION OF THE INVENTION

The dial 90 of the rate of change in altitude indicator 28 is part of the instrument panel in an aircraft. When the aircraft is flying at a constant altitude, pointer 86 remains at the null position 88.

If the aircraft changes altitude, altimeter servomotor 36 responds to an input signal and rotates gear 32, clockwise for ascent and counterclockwise for descent, to provide pointer 16 with information relating to the present altitude of the aircraft.

Rotational movement of gear 32 causes the photocell 34 to generate a sinusoidal signal, whose frequency is proportional to the angular rotation speed of the gear 32, through the sequential interruption of the light beam from diode 30. Each positive node of the sinusoidal wave signal is amplified and converted into a square wave signal. The leading edge of each square wave signal triggers a pulse of predetermined width which activates the transistor switch 52 to allow electrical current to flow from source 22 to the summing junction 60 of the voltage generator 24 for a time period equal to the time period of the pulse. Electrical current flowing from the transistor 52 charges a capacitor 62 at a constant rate until fully charged at peak 66 during this time period. Thereafter, the pulse terminates, and capacitor 62 discharges to ground 92 through resistor 68. However, before the capacitor 62 is completely discharged, another pulse triggers the switch means 20 to recharge the capacitor 62 to peak 66' shown in FIG. 2. When the peak voltage 66, 66', 66", ... 66$^n$ and the discharge intersection voltage 72, 72', 72", ... 72$^n$ are averaged with respect to time, a steady state voltage is generated across capacitor 62. This steady state voltage is communicated to inverting and non-inverting buffers 74 and 76 where the steady state voltage is amplified and directed through the flip-flop switch 80 as either a positive or negative signal depending upon the rotational direction of gear 32. The steady state voltage drives the pointer 86 away from the null position 88 to provide the pilot with information relating to the rate of change in altitude of the aircraft.

We claim:

1. A rate of change in altitude indicating apparatus comprising:
   a source of electrical current;
   detector means for producing a sinusoidal input signal indicative of changes in altitude;
   generator means connected to said detector means for generating a pulse signal representative of each positive node of said sinusoidal input signal;
   first switch means responsive to said pulse signal to allow electrical current to flow from said source during the duration of each positive node;
   means responsive to said electrical current for creating a voltage signal which is directly proportional to the frequency of said sinusoidal input signal; and
   indicator means responsive to said voltage signal for providing an operator with information relating to said rate of change of altitude.

2. The rate of change in altitude indicating apparatus, recited in claim 1 wherein said means for creating said voltage signal includes:
   capacitor means for retaining voltage at a constant rate with electrical current flow from said source; and
   resistance means connected to said capacitor means for controlling the discharge of voltage from said capacitor means in the absence of current flow from said source, said constant rate of voltage retention and said controlled discharge of voltage being averaged with respect to a given time period to create said voltage signal.

3. The rate of change in altitude indicating apparatus, recited in claim 2 wherein said means for creating said voltage signal further includes:

second switch means responsive to changes in altitude for generating a positive operational signal during an increase in altitude and a negative operational signal during a decrease in altitude;

a non-inverting buffer responsive to said positive operational signal for amplifying said voltage signal to an operational level sufficient to drive said indicator means in a positive direction with respect to a null position.

4. The rate of change in altitude computer, recited in claim 3 wherein said means for creating said voltage signal further includes:

an inverting buffer responsive to said negative operational signal for amplifying said voltage signal to an operational level sufficient to drive said indicator means in a negative direction with respect to the null position.

5. The rate of change in altitude indicating apparatus, as recited in claim 1 wherein said detector means includes:

light source for generating a beam of light;

mask means adjacent said light source so that said beam of light passes through said mask means, said mask means being rotated by an altitude responsive member; and receiver means responsive to said beam of light which passes through said mask means for developing said input signal, said input signal having a sinusoidal wave form which represents rotational movement of said mask means.

6. The rate of change in altitude indicating apparatus, as recited in claim 5 wherein said detector means includes:

amplifier means connected to said receiver means for changing said sinusoidal wave form into a square wave form to produce an operational timing signal, said timing signal activating said generator to produce a constant width pulse signal from each square wave form of said timing signal.

7. The rate of change in altitude indicating apparatus, as recited in claim 6 wherein said first switch means includes:

transistor means having a base connected to said generator means, a collector connected to said source of electrical current, and an emitter connected to said means creating a constant voltage, said constant width pulse signal changing the electrical potential on said base to allow a fixed electrical current to flow from said emitter for the duration of each pulse signal.

8. A rate of change in altitude computer comprising:

a light source for generating a beam of light;

mask means adjacent said light source;

an input member for rotating said mask means in response to changes in altitude;

receiver means responsive to said beam of light which passes through said mask means for developing an input signal having a sinusoidal wave form;

generator means responsive to the positive node of said input signal for generating a switching signal;

switch means responsive to said switching signal for allowing electrical current to periodically flow from a source of electrical current;

means responsive to the flow of said electrical current for creating a voltage signal which is directly proportional to the frequency of said input signal; and indicator means responsive to said voltage signal for providing an instrument with information relating to the rate of change in altitude.

9. The rate of change in altitude computer, as recited in claim 8, wherein said means for creating said voltage signal includes:

capacitor means for retaining voltage at a constant rate with electrical current flow from said source; and resistance means connected to said capacitor means for controlling the discharge of voltage from said capacitor means in the absence of current flow from said source, said constant rate of voltage retention and said controlled discharge of voltage being averaged with respect to a given time period to create said voltage signal.

10. The rate of change in altitude computer, as recited in claim 9, wherein said means for creating said voltage signal further includes:

buffer means connected to said capacitor means and resistance means for amplifying said voltage signal;

flip-flop switch means for transmitting the amplified voltage signal to said indicator means; and control member and said flip-flop switch means connected to said input means for selecting different flow paths for the amplified voltage signal from said buffer means to said indicator means corresponding to positive and negative changes in altitude.

* * * * *